United States Patent [19]

Moizumi

[11] Patent Number: 4,503,686
[45] Date of Patent: Mar. 12, 1985

[54] CONTROL SYSTEM FOR A SPLIT TYPE AIR-CONDITIONER

[75] Inventor: Ken'ichi Moizumi, Fuji, Japan

[73] Assignee: Tokyo Shibaura Denki Kabushiki Kaisha, Kawasaki, Japan

[21] Appl. No.: 528,246

[22] Filed: Aug. 31, 1983

[30] Foreign Application Priority Data

Sep. 8, 1982 [JP] Japan .................................. 57-156444

[51] Int. Cl.³ ............................................ F25B 43/02
[52] U.S. Cl. ........................................ 62/467; 165/22; 236/51
[58] Field of Search ............... 236/51; 165/22; 62/126, 62/160, 467

[56] References Cited

FOREIGN PATENT DOCUMENTS 55-20305 2/1980 Japan ...................................... 236/51

OTHER PUBLICATIONS

Ide et al., "Air Conditioners Incorporating Variable-Capacity-Control Inverter", Toshiba Review, vol. 37, No. 7 (1982).

Primary Examiner—William E. Wayner
Assistant Examiner—J. Sollecito
Attorney, Agent, or Firm—Schwartz, Jeffery, Schwaab, Mack, Blumenthal & Koch

[57] ABSTRACT

In a control system for a split type air-conditioner comprising an indoor control circuit and an outdoor control circuit wherein control signals are exchanged between the indoor and outdoor control units via a signal conductor, each of the indoor control circuit and the outdoor control circuit comprises a switching element for performing ON-OFF operation to serially transmit control logic signals towards the opposite control circuit and a signal receiving element for receiving control logic signals transmitted from the opposite control circuit. The switching elements and the signal receiving elements are connected in series with each other by the signal conductor, and when control logic signals are transmitted from one of the control circuits, the switching element in the other control circuit is kept closed.

12 Claims, 3 Drawing Figures

CONTROL SYSTEM FOR A SPLIT TYPE AIR-CONDITIONER

BACKGROUND OF THE INVENTION

The present invention relates to a control system for a split type air-conditioner wherein an indoor unit and an outdoor unit are installed separately from each other.

Split type air-conditioners comprising an indoor unit and an outdoor unit positioned separately from each other have been widely used. Such split type air-conditioners are provided with an indoor control circuit for effecting control of the indoor unit and an outdoor control circuit for effecting control of the outdoor unit. Accordingly, a signal conductor or line for coupling the two control circuits is required in order to serially transmit control logic signals therebetween.

Meanwhile, in the split type air-conditioners, when, for instance, heating operation is effected, there are instances where the outdoor unit enters into cooling operation cycle to effect defrosting operation, disregarding the control signals transmitted from the indoor unit. In this situation, it is impossible for the indoor unit to directly detect the entry of the outdoor unit into the defrosting operation. For this reason, temperature sensed by an indoor heat exchange sensor is monitored to indirectly detect the defrosting operation of the outdoor unit.

However, with such an indirect detection, it is difficult for the indoor unit to be fully informed of the state of the outdoor unit. Further, when a compressor is turned off in response to a command from the outdoor control circuit, it is also difficult to detect it at the indoor unit. Thus, the prior art control systems have drawbacks in that it is difficult for the indoor unit to detect control operation of the outdoor unit which is independently effected disregarding the control signals transmitted from the indoor unit. This causes inconveniences to users.

SUMMARY OF THE INVENTION

With the above in view, an object of the present invention is to provide a control system for a split type air-conditioner permitting an indoor control circuit to sense operations being performed at an outdoor control circuit, without increasing the number of signal conductors coupling the indoor control circuit and the outdoor control circuit.

Another object of the present invention is to provide a control system for a split type air-conditioner capable of alternately transmitting signals from an indoor unit to an outdoor unit and signals from an outdoor unit to an indoor unit by means of a common signal conductor.

Other objects of the invention will be apparent from the following description in the specification and drawings.

DESCRIPTION OF A PREFERRED EMBODIMENT

Figure 1:
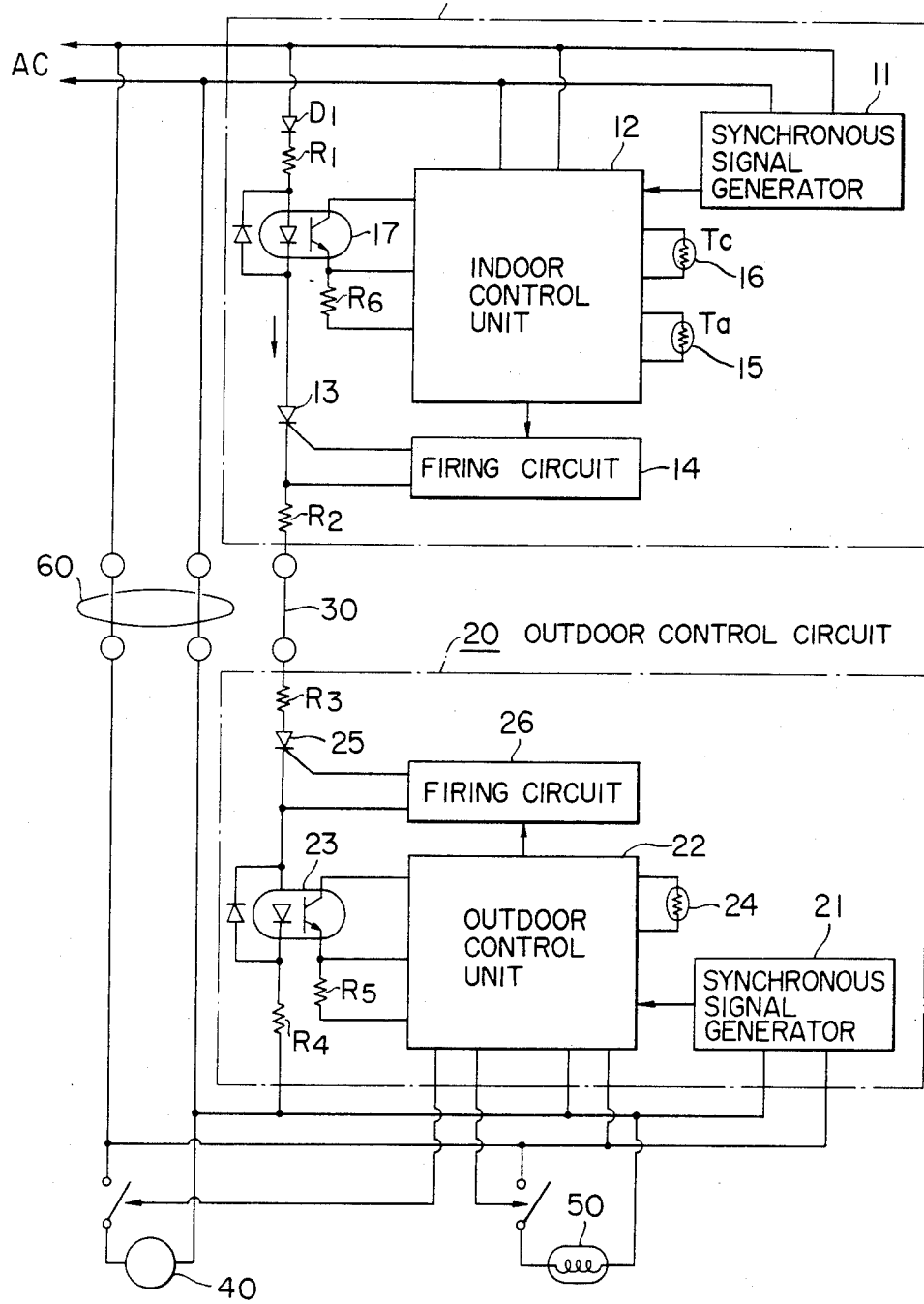
FIG. 1 is a block diagram illustrating a preferred embodiment according to the present invention.

FIG. 1 shows an embodiment of a control system for a split type air-conditioner according to the present invention.

This control system comprises an indoor control circuit 10 and an outdoor control circuit 20 wherein two control circuits are coupled by means of a serial signal conductor 30. In the indoor control circuit 10, there are provided a synchronous signal generator 11 for producing a synchronous signal in synchronism with an AC power supply, an indoor control unit 12 which is timed with the synchronous signal, and a firing circuit 14 for firing a switching element such as a thyristor 13, in response to a control signal fed from the indoor control unit 12. In addition, a signal receiving element 17 is connected in series with the serial signal conductor 30 to receive signals from the outdoor unit. The signals received by the receiving element 17 are entered into the indoor control unit 12.

The outdoor control circuit 20 is generally similar to the indoor control circuit 10, and is provided with a synchronous signal generator 21 for producing a synchronous signal in synchronism with the AC power supply, an outdoor control unit 22 which is timed with the synchronous signal, and a signal receiving element 23 for receiving control signals transmitted from the indoor control circuit 10 and entering them into the outdoor control unit 22. The outdoor unit is further provided with a compressor 40 controlled by the outdoor control circuit 20. The outdoor control circuit 20 further comprises a switching element such as a thyristor 25. The switching element 25 is made conductive or fired by a firing circuit 26 provided in the outdoor control circuit 20, to transmit control signals to the indoor unit. The firing circuit 26 is controlled by the outdoor control unit 22. Each of the signal receiving elements 17 and 23 may comprise a photo-coupler.

As mentioned, the indoor and outdoor units are provided separately from each other. The indoor and outdoor units are coupled by means of the serial signal conductor 30 for exchanging control signals as well as by power supply conductors 60 for feeding an AC electric power. In operation, the indoor control unit 12 senses signals fed from a room temperature sensor 15 and an indoor heat exchange sensor 16 to produce control signals for the firing circuit 14.

On the other hand, the outdoor control unit 22 senses signals fed from an outdoor heat exchange sensor 24 to produce control signals for the compressor 40 and four way valve coil 50. Control signals to be directed from the indoor control circuit 10 to the outdoor control circuit 20 are transmitted through the serial signal conductor 30 as a set of data whose significance depends on firing operation of the switching element 13 which is controlled by the firing circuit 14. The outdoor control circuit 20 detects a current which flows when the switch element 13 is turned on, by means of the signal receiving element 23 to input the current which has been detected to the outdoor control unit 22. The outdoor control unit 22 determines the significances of ON-OFF control signals for the compressor 40 and the four way valve coil 50 on the basis of the signal fed from the outdoor heat exchange sensor 24 and control signals transmitted from the indoor control circuit 10 and feeds the ON-OFF control signals to the firing circuit 26.

A signal, which is transmitted from the outdoor control circuit 20, is received by the signal receiving element 17, and is then sensed across a resistor $R_6$. The signal thus sensed is inputted to the indoor control unit 12. On the other hand, a signal, which is transmitted from the indoor control circuit 10, is sensed by the signal receiving element 23, and is then sensed across a resistor $R_5$. The signal thus sensed is inputted to the outdoor control unit 22. Transmission of control signals to the outdoor unit is accomplished by control by the indoor control unit 12 of the switching element 13 through the firing circuit 14. On the other hand, transmission of control signals to the indoor unit is accomplished by control by the outdoor control unit 22 of the switching element 25 through the firing circuit 26.

Figure 2:
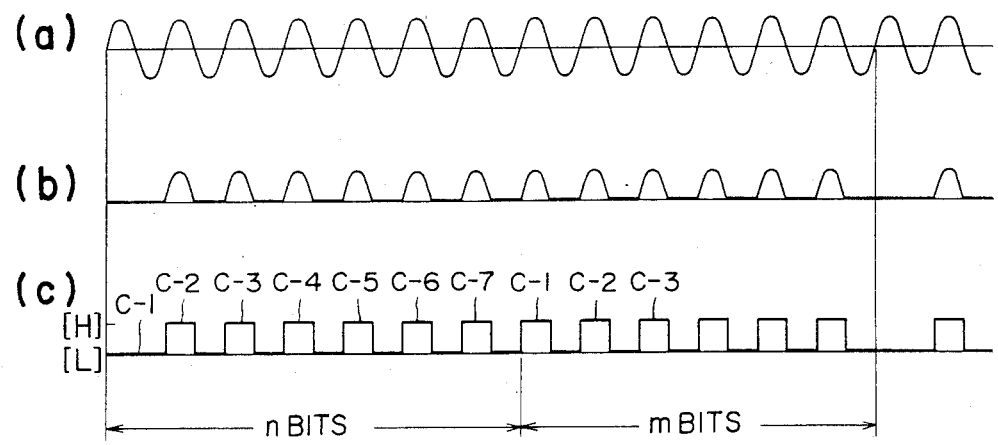
FIG. 2 is a time chart showing the condition where signals fed from an indoor control unit are identical with those fed from an outdoor control unit in the block diagram shown in FIG. 1.
Figure 3:
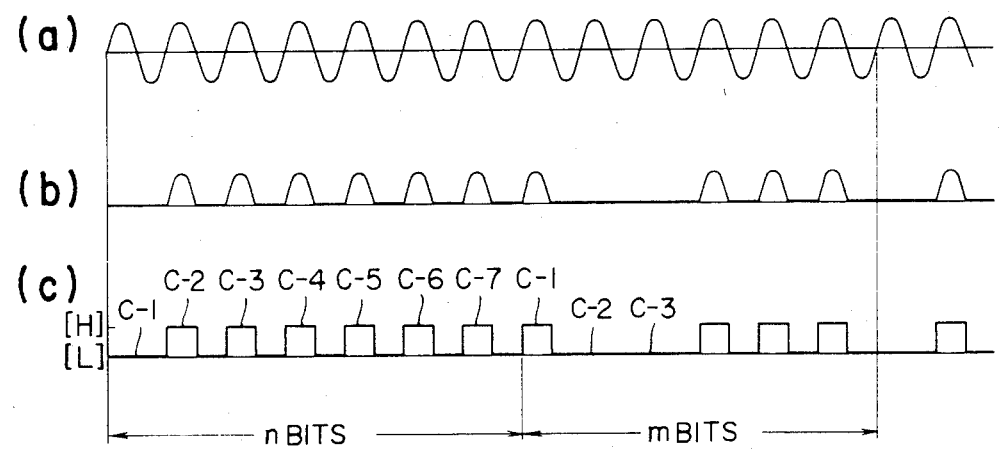
FIG. 3 is a time chart showing the condition where signals fed from the indoor control unit are different from those fed from the outdoor control unit in the block diagram shown in FIG. 1.

FIGS. 2 and 3 are waveforms showing examples of control signals produced by the system of the invention. FIGS. 2(a) and 3(a) are diagrams illustrating an AC power supply voltage used for deriving a synchronous signal, respectively, FIGS. 2(b) and 3(b) are diagrams showing firing currents of the switching elements 13 and 25, respectively, and FIGS. 2(c) and 3(c) are waveforms showing control signals, respectively. The control signals are divided into data comprising n bits (n=7 in the example shown) transmitted from the indoor unit to the outdoor unit and data comprising m bits transmitted from the outdoor unit to the indoor unit. Thus, the control signals comprise (n+m) bits. The bits indicative of transmitted data include a start signal C-1, a cooling-/heating selection signal C-2, a compressor controlling signal C-3, and dummy signals C-4 to C-7. When needed, other data may be transmitted as control signals.

The operation when transmitting the start signal C-1, the cooling/heating selection signal C-2, and the compressor controlling signal C-3 will be described with reference to FIGS. 2 and 3.

When the system is initially powered, the thyristors 13 and 25 are kept turned on for about 3 seconds, in response to respective signals from the indoor control unit 12 and the outdoor control unit 22. During this time interval, signals of HIGH level are successively transmitted from the indoor control unit 12. After the 3 seconds, a signal C-1 of low level is outputted from the indoor control unit 12. The time point at which the LOW level signal C-1 is produced serves as a start time point of the data exchanging operation.

In the example shown in FIG. 2, the heating signal (heating/cooling selection signal being "H") and the compressor ON signal are transmitted from the indoor unit, and in conformity therewith, the outdoor unit operates in a heating cycle with the compressor ON. As shown, the switching element 25 in the outdoor unit is kept closed throughout the period when all the n bit signals are transmitted. The signals sensed by the signal receiving element 17 in the indoor unit have the same significance as those transmitted from the indoor unit to the outdoor unit. Accordingly, this makes it possible to confirm that the outdoor unit is operating in conformity with the control signals transmitted from the indoor unit.

In the example shown in FIG. 3, the heating signal and the compressor ON signal are transmitted from the indoor unit, similarly as in FIG. 2. However, the operation of the outdoor unit is not in conformity with the control signals, and the outdoor unit is operating in the cooling cycle and the compressor is OFF. The switching element 25 in the outdoor unit operates so as to cause the heating/cooling selection signal C-2 and the compressor controlling signal C-3 at the outdoor unit to be LOW. Accordingly, the signal indicative of the cooling cycle and the compressor OFF signal are sensed by the receiving element 17 in the indoor unit. Thus, it is possible to detect that the operation of the outdoor unit is different from that commanded by the control signals transmitted from the indoor unit. In this instance, the thyristor 13 is placed in ON state with respect to all the m bits.

In the case of a heat-pump type air-conditioner, such an operation corresponds to a defrosting operating condition. It is therefore possible for the control circuit in the indoor unit to detect that the outdoor unit is in such an operating condition.

The LOW level of the start signal C-1 indicates a start of data transmission from the indoor unit to the outdoor unit. On the other hand, the HIGH level of the start signal C-1 indicates a start of data transmission from the outdoor unit to the indoor unit.

Although, in the embodiment described, the numbers of bits, n and m are different from each other, they may be the same as each other.

In the embodiment described, the signals C-4 to C-7 serve as dummy signals. For instance, the signals C-4, C-5, C-6 and C-7 are all "H" to indicate that the transmission of n bits signals from the control unit 12 is ending.

As described, the control system according to the present invention has switching elements and signal receiving elements provided both at the indoor and outdoor units and they are coupled via a single serial signal conductor, and control by a predetermined control signal pattern is made. This makes it possible to mutually transmit and receive control signals between the indoor and outdoor units. Accordingly, it is possible for the indoor unit to detect when the outdoor unit is in a different operation condition from that commanded by the control signals from the indoor unit.

What is claimed is:

1. A control system for a split type air-conditioner comprising an indoor control circuit for controlling an indoor unit, and an outdoor control circuit for controlling an outdoor unit wherein control signals are exchanged between the indoor and outdoor control units via a signal conductor, wherein the indoor and outdoor control circuits are connected to a common AC power supply, the indoor control circuit comprises a first switching element for performing ON-OFF operation to serially transmit control logic signals towards the outdoor control circuit through the signal conductor, and a first signal receiving element for receiving control logic signals transmitted from the outdoor control circuit, the outdoor control circuit comprises a second switching element for performing ON-OFF operation to serially transmit control logic signals towards the indoor control unit through the signal conductor, and a second signal receiving element for receiving control logic signals transmitted from the indoor control circuit, said first and second switching elements and said signal receiving elements are connected in series with each other by the signal conductor, one end of said signal conductor is connected to a first point in said indoor unit having a first AC potential, while the other end of said signal conductor is connected to a second point in said outdoor unit having a second AC potential different from said first AC potential, and the switching element provided in said other control circuit is kept closed when control logic signals are transmitted from one of the indoor and outdoor control circuits to the other control circuit.

2. A control system as defined in claim 1, wherein said indoor and outdoor control circuits are connected to the same power supply, one end of said signal conductor is connected to a first line of said power supply within the indoor unit, and the other end of the signal conductor is connected to a second line of said power supply within the outdoor unit having a potential different from that of said first line.

3. A control system as defined in claim 1, wherein each of said first and second switching elements comprises a thyristor, and the thyristors are connected to the signal conductor in the same direction.

4. A control system as defined in claim 3, wherein said control logic signal comprises a series of bits, successively transmitted, each bit transmitted in a half cycle when the voltage applied across the ends of the signal conductor is in a forward direction with respect to said thyristors.

5. A control system as defined in claim 1, wherein each of said first and second signal receiving elements comprises a photo-coupler.

6. A control system as defined in claim 1, wherein said control logic signal comprises data bits respectively assigned different items of information, and being transmitted in a predetermined sequence.

7. A control system as defined in claim 1, wherein the first signal receiving element, the first switching element, the second switching element and the second signal receiving element are connected in series on the signal conductor in the order mentioned.

8. A control system for a split type air-conditioner to be used with an AC power source including first and second power lines having a periodically-varying potential difference therebetween, said control system comprising:

an indoor control unit for controlling an indoor unit, said indoor control unit further comprising a first receiving element and a first switching element operatively connected to said first receiving element;

an outdoor control unit for controlling an outdoor unit, said outdoor control unit further comprising a second switching element and a second receiving element operatively connected to said second switching element and said second power line;

a signal conductor operatively interconnecting said first and second switching elements; and means, within said indoor control unit and operatively interconnecting said first power line and said first receiving element, for sequentially generating pulse signals, each synchronous with respective periodic positive excursions of said periodically-varying potential difference, when both said first switching element and said second switching element are ON, said first and second receiving elements being arranged to receive said pulses.

9. A control system as claimed in claim 8, wherein each of said first and second switching elements comprises a thyristor, and the thyristors are connected to the signal conductor in the same direction as each other.

10. A control system as claimed in claim 8, wherein a series of said pulses constitutes a control logic signal, each pulse comprising a bit thereof.

11. A control system as claimed in claim 8, wherein each of said first and second receiving elements comprises a photocoupler.

12. A control system as claimed in claim 10, wherein said control logic signal comprises data bits respectively assigned to represent different data, and wherein said bits are transmitted in a predetermined sequence.

* * * * *